United States Patent
Wilensky

(10) Patent No.: US 10,163,254 B2
(45) Date of Patent: Dec. 25, 2018

(54) RENDERING OF DIGITAL IMAGES ON A SUBSTRATE

(71) Applicant: Adobe Systems Incorporated, San Jose, CA (US)

(72) Inventor: Gregg Darryl Wilensky, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/192,541

(22) Filed: Jun. 24, 2016

(65) Prior Publication Data

US 2017/0372511 A1 Dec. 28, 2017

(51) Int. Cl.
G06T 15/50 (2011.01)
G06T 15/20 (2011.01)
G06T 19/20 (2011.01)

(52) U.S. Cl.
CPC ............ G06T 15/50 (2013.01); G06T 15/205 (2013.01); G06T 19/20 (2013.01)

(58) Field of Classification Search
None
See application file for complete search history.

(56) References Cited

U.S. PATENT DOCUMENTS

| 7,639,250 B2* | 12/2009 | Xu ........................ G06T 15/02 345/419 |
| 8,872,853 B2* | 10/2014 | Sugden ................ G02B 27/017 345/426 |
| 9,035,880 B2* | 5/2015 | Elyada ...................... G09G 5/00 345/158 |
| 9,575,615 B1* | 2/2017 | Nicholls ................. G06F 3/048 |
| 2008/0211809 A1* | 9/2008 | Kim .................... G06K 9/00697 345/420 |
| 2009/0154762 A1* | 6/2009 | Choi ....................... G06T 11/60 382/100 |
| 2011/0273369 A1* | 11/2011 | Imai ....................... G06T 15/50 345/158 |

(Continued)

FOREIGN PATENT DOCUMENTS

WO WO-03023684 3/2003

OTHER PUBLICATIONS

"Combined Search and Examination Report", GB Application No. 1706395.9, dated Sep. 29, 2017, 6 pages.

*Primary Examiner* — Jason Pringle-Parker
(74) *Attorney, Agent, or Firm* — Wolfe-SBMC

(57) ABSTRACT

Techniques and systems are described to render digital images on a defined substrate. In an example, a three-dimensional model is generated of the digital image as disposed on a substrate. Generation of the model includes application of a three-dimensional model of a surface of the substrate to the digital image and addition of material properties of the substrate to the three-dimensional model of the digital image). A viewing direction is detected of the three-dimensional model of the digital image, the detecting based on one or more sensors of the computing device. An effect of light is also ascertained on the three-dimensional model of the digital image having the material properties of the substrate at the detected viewing direction. The three-dimensional model of the digital image is rendered based on the detected viewing direction and the ascertained effect of light for display by the computing device.

19 Claims, 12 Drawing Sheets

(56) References Cited

U.S. PATENT DOCUMENTS

| | | | | |
|---|---|---|---|---|
| 2011/0310111 A1* | 12/2011 | Cho | .................... | G06T 11/001 |
| | | | | 345/582 |
| 2013/0307829 A1* | 11/2013 | Libin | .................... | G06F 3/016 |
| | | | | 345/179 |
| 2013/0321618 A1* | 12/2013 | Krishnaswamy | ....... | G06T 15/80 |
| | | | | 348/135 |
| 2014/0229873 A1* | 8/2014 | Tremblay | ................ | G06F 3/017 |
| | | | | 715/771 |
| 2016/0225164 A1* | 8/2016 | Tomlin | .................... | G06T 15/04 |
| 2017/0109931 A1* | 4/2017 | Knorr | .................... | G06T 19/006 |

\* cited by examiner

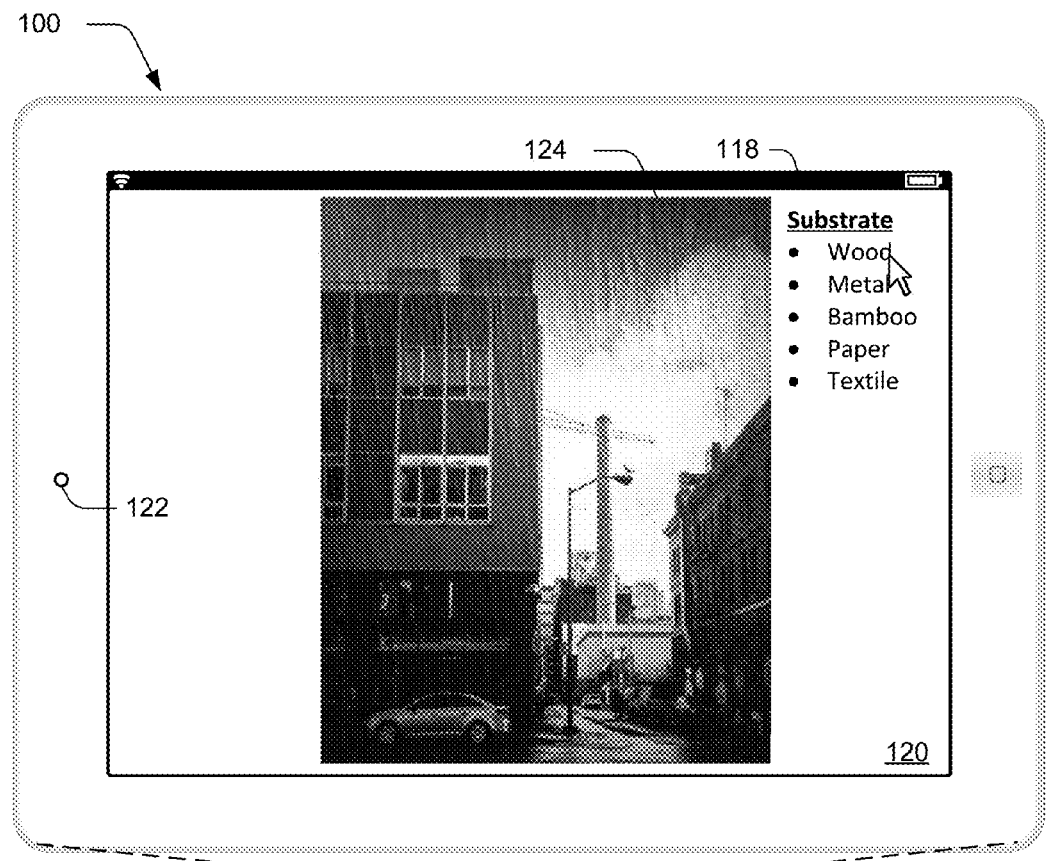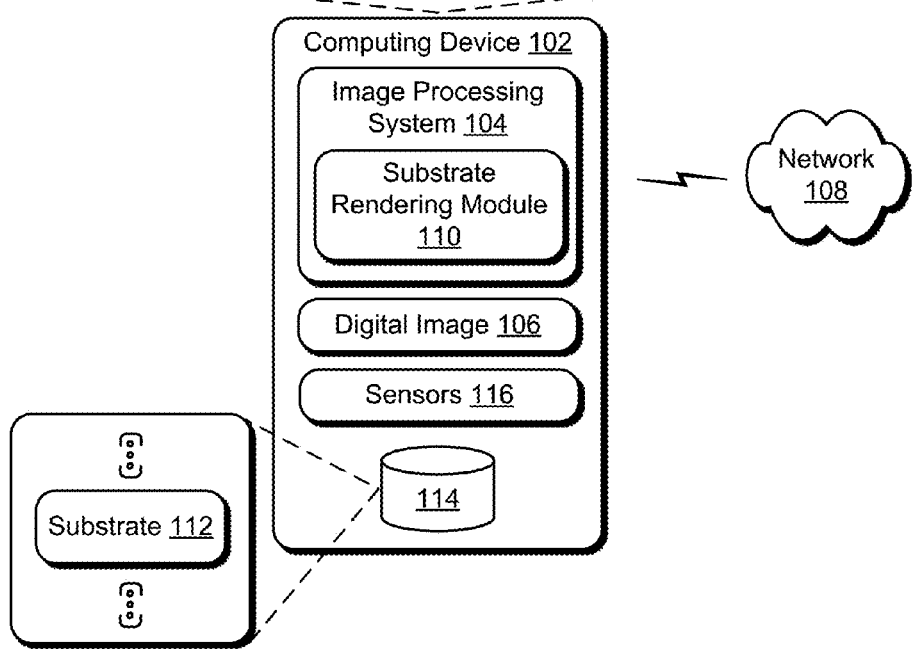
Fig. 1

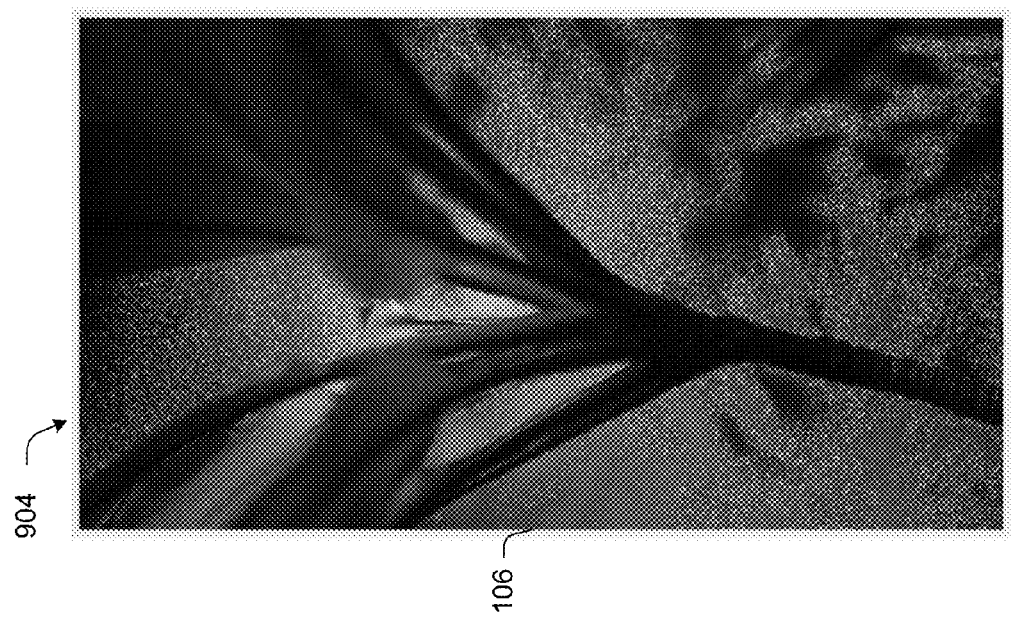
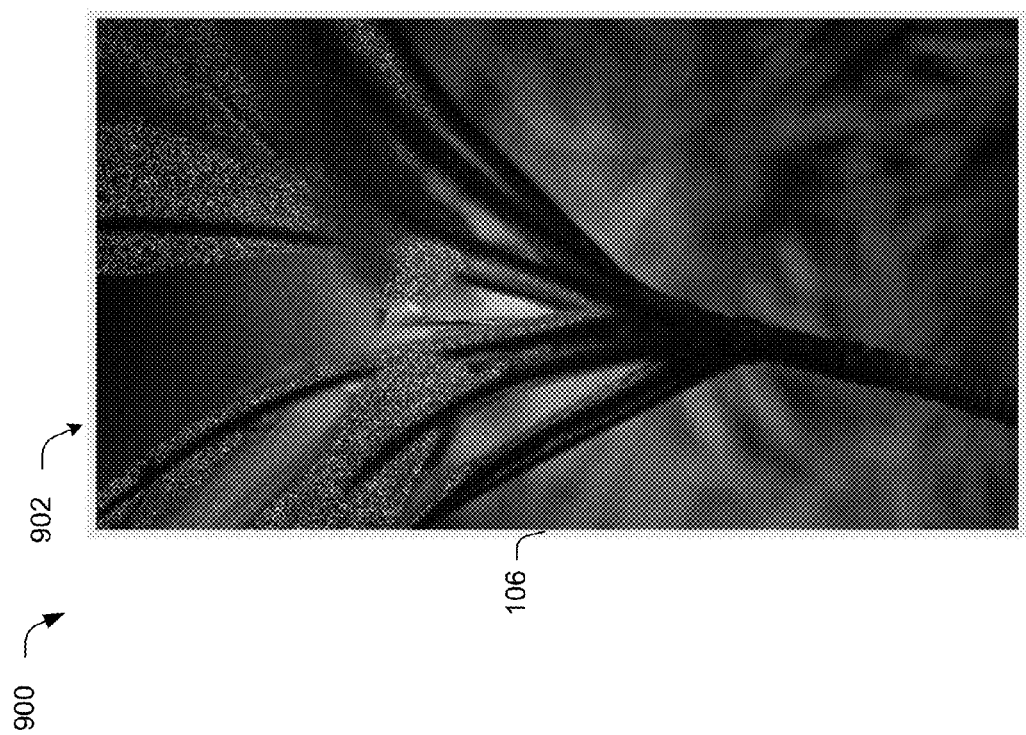
Fig. 9

RENDERING OF DIGITAL IMAGES ON A SUBSTRATE

BACKGROUND

The prevalence of digital images is ever increasing. This is due to increases in availability of digital image capture, from use of dedicated digital cameras to use of a variety of devices encountered in everyday life, such as mobile phones, tablets, game consoles, televisions, children's toys, and so forth. Accordingly, digital images have become and continue to be a part of a user's everyday life.

However, a user's experience in interacting with digital images still lacks realism as compared with interaction with conventional "material images," i.e., images disposed on a physical medium such as paper, canvas, and so on. This is caused by a gap between how a digital image is rendered by a device and how a conventional physical image is formed on this material. For example, an artist may choose a material to affect a look-and-feel of the conventional material image, such as through use of a choice of paper to alter gloss, texture, matte reflectivity, and coatings. Conventional techniques used to render digital images, however, lack this choice and thus limit a user's experience when interacting with digital images.

SUMMARY

Techniques and systems are described to render digital images on a defined substrate. In an example, a three-dimensional model is generated of the digital image as disposed on a substrate. Generation of the model includes application of a three-dimensional model of a surface of the substrate to the digital image and addition of material properties of the substrate to the three-dimensional model of the digital image. The substrate, for instance, may include a 3D model of the surface (e.g., a topology) and defined material properties of the surface (e.g., glossiness, matte, reflectivity, and so forth).

A viewing direction is detected of the three-dimensional model of the digital image, the detecting based on one or more sensors of the computing device. The viewing direction may be based on a variety of different inputs. In one example, the inputs describe a device orientation of the computing device in three dimensional space. In another example, the inputs describe a viewer orientation, e.g., through gaze detection, head placement, and so forth.

An effect of light is also ascertained on the three-dimensional model of the digital image having the material properties of the substrate at the detected viewing direction. The effect of light, for instance, may originate from one or more virtual light sources defined as part of the definition of the substrate. In another example, environmental light of a physical environment of the computing device is detected and modeled as part of rendering of the image.

The three-dimensional model of the digital image is rendered based on the detected viewing direction and the ascertained effect of light for display by the computing device. Further, this rendering may be dynamically updated to address changes in a likely viewing direction, a physical environment of a user, or even defined changes to the 3D model, material properties, and virtual light sources over time that are defined as part of the substrate. In this way, a digital image may be transformed to support a dynamic interactive experience.

The rendering of the digital image may also be configured to incorporate digital content, such as a watermark, copyright notice, signatures, a hyperlink, QR code, and so forth. To do so, the digital content is incorporated as part of a three dimensional model of the digital image as disposed on the substrate such that the digital content is viewable at a particular viewing direction. In this way, the digital content does not interfere with an overall user experience with the digital image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 1 is an illustration of an environment in an example implementation that is operable to employ rendering techniques described herein.

FIG. 9 depicts an example implementation showing first and second examples of the digital image of FIG. 1 as rendered on different substrates.

DETAILED DESCRIPTION

Overview

Figure 2:
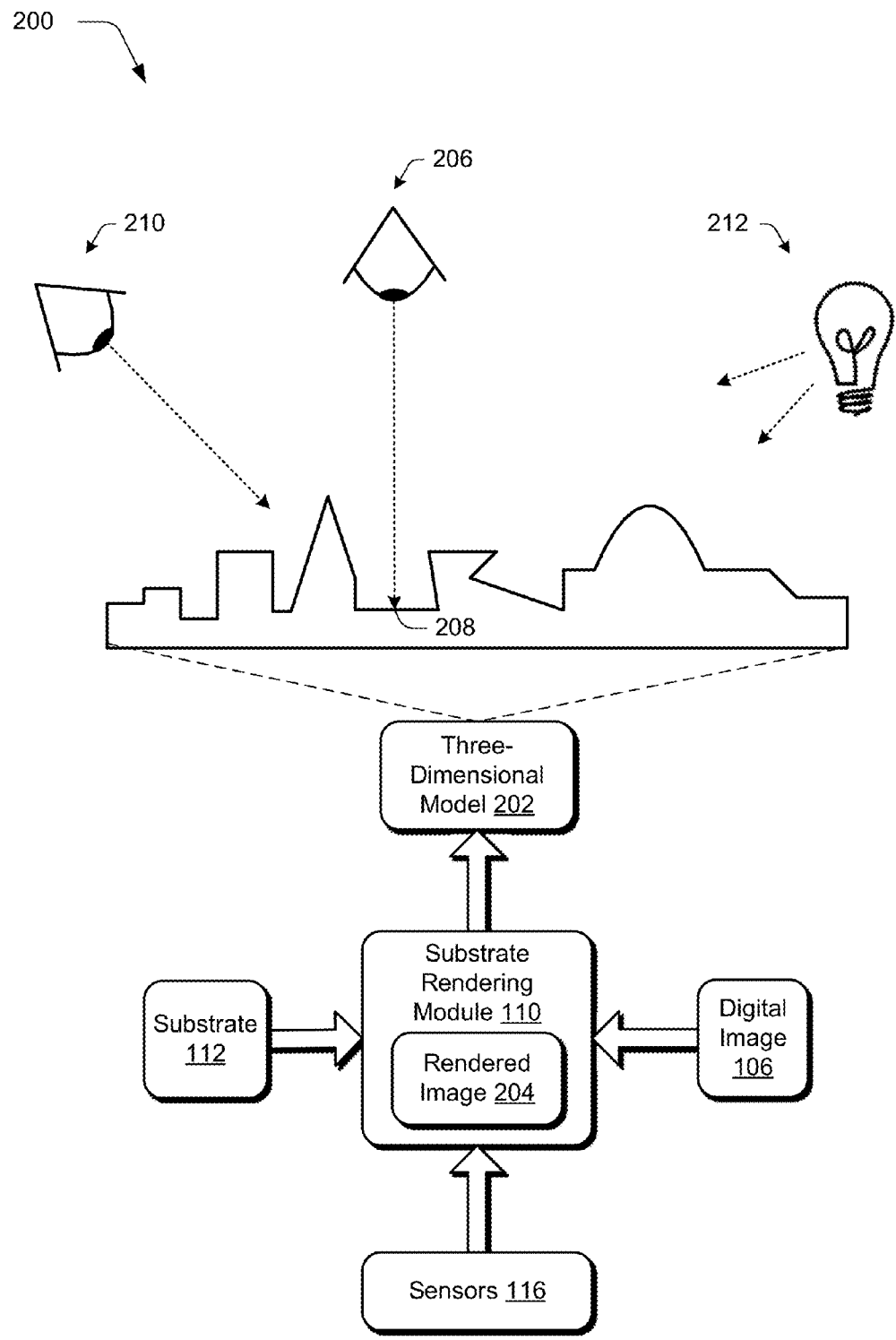
FIG. 2 depicts a system in an example implementation showing a three dimensional model of a digital image as disposed on a substrate.

There exists a gap between a user experience in viewing a material image and a user experience in viewing a digital image. For example, a large portion of a user experience afforded by a material image is based on media on which the image is disposed. An artist, for instance, may select media to provide different amounts of gloss and matte reflectivity, textures, and other coatings. Historic processes such as gum bi-chromate prints had variable thickness gum coatings, platinotypes emphasize an image through use of incorporated paper fibers, Daguerrotypes draw upon metallic reflectivity, and so forth. Additionally, viewing of these material images in a physical environment is dynamic such that a play of lighting with the material image changes based on a user's viewpoint. This provides a subtle textural element which enlivens and increases user engagement with the material image, which is lacking in current digital image user experiences.

Digital image substrate rendering techniques are described. In one or more implementations, techniques and systems are described that are configured to render digital images as the image would appear on a defined substrate. In this way, a user is provided with a dynamic viewing experience that mimics an experience with material images, which may change dynamically with changes in a likely viewing direction of the user as well as changes in a physical environment of the user.

A user, for instance, may select from a variety of different substrate options. From this, a user input is received by the computing devcie that is indicative of a selection of a substrate. Characteristics of the selected substrate are then used to form a three-dimension model of the digital image as if disposed on the substrate by a computing device. Examples of substrate characteristics include material properties of the selected substrate, a three-dimensional model of the selected substrate (e.g., a surface texture as a "bump map"), virtual light sources disposed in a virtual space in relation to the three-dimensional model, light sources in a physical environment of the device, and so forth. Material properties include gloss layers, internal material properties that effect subsurface scattering of light, and so forth. Material properties may also be determined by the computing device that renders the image automatically from content of the digital image, e.g., through modulation by image intensity or color. Material properties of the substrate may be "painted" through user interaction with a user interface, detected from a physical environment of the computing device (e.g., by using a camera) and so forth. These characteristics may also be configured to change over time as part of the definition of the substrate, e.g., material properties and lighting may change to mimic interaction in the real world.

A likely viewing direction of the three-dimensional model of the digital image on the substrate is then determined by the computing device. In one example, the likely viewing direction is determined using sensors of the computing device to determine an orientation of the device in three-dimensional space. In another example, the likely viewing direction is determined using sensors of the computing device as to a likely direction of a user that is to view the digital image, such as through use of eye detection, face detection, and so forth using a front facing camera of the computing device, VR/AR eyewear, and so forth.

The likely viewing direction is then used to render the three-dimensional model of the image on the substrate, a result of which is displayed by a display device of the computing device. Additionally, this may be performed dynamically such that the rendering is updated in response to detected changes in the likely viewing direction and changes in a physical environment of the user, e.g., lighting. In this way, a user that views the rendered image may be exposed to changes in lighting and material properties as the likely viewing direction changes and thus increases realism to mimic interaction with a material image. In one or more implementations, this rendering of the digital image is not destructive and thus may support changes in selection of substrates and lighting without affecting the image.

These techniques may also be leveraged to support a variety of additional functionality. In one example, digital content is incorporated as part of the three dimensional model of the image on the substrate such that the digital content is viewable at a particular viewing direction but not viewable in other directions. An artist, for instance, may incorporate digital content such as a copyright notice, signature, coupon code, hyperlink, and so on that is viewable at a single viewing direction. In this way, viewing of the digital content does not interfere with a user's experience in viewing the digital image at other viewing directions, thereby promoting an improved user experience. Further discussion of these and other examples is included in the following sections.

In the following discussion, an example environment is first described that may employ the rendering techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ substrate rendering techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles, virtual or augmented reality devices) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud".

The computing device 102 is illustrated as including an image processing system 104. The image processing system 104 is implemented at least partially in hardware of the computing device 102 to process and transform a digital image 106. Such processing includes creation of the digital image 106, modification of the digital image 106, and rendering of the digital image 106 for output. Although illustrated as implemented locally at the computing device 102, functionality of the image processing system 104 may also be implemented as whole or part via functionality available via the network 108, such as part of a web service or "in the cloud" as further described in relation to FIG. 12.

An example of functionality incorporated by the image processing system 104 to process the digital image 106 is illustrated as a substrate rendering module 110. The substrate rendering module 110 is implemented at least partially in hardware of the computing device 102 to render the digital image 106 on a defined one of a plurality of substrates 112, which are illustrated as stored in storage 114 of the computing device 102. The substrates 112 are selectable by a user through interaction with a user interface 118 displayed by a display device 120 to form a three-dimensional model of the digital image 106 using the selected substrate 112, e.g., wood in the illustrated example.

Sensors 116 of the computing device 102 are then used to determine a likely viewing direction of a user to the display device 118 of the computing device 102. The sensors 116, for instance, may be used to detect an orientation of the computing device 102 in three-dimensional space. Examples of such sensors include accelerometers, magnetometers, inertial sensors, ultrasonic sensors, use of electromagnetic or acoustic waves, time-of-flight cameras, and so forth.

The sensors 116 may also be configured to detect the viewing direction of the user directly, such as through use of eye and facial recognition detected using a front-facing camera 122. A variety of other examples are also contemplated, such as a combination of orientation and gaze detection as used as part of augmented reality or virtual reality. For example, the sensors 116 may be used to detect a surface in a physical environment of the computing device 102, and from this, select one of the plurality of substrates 112. The digital image 106 may then be rendered to be viewable in three dimensions in a manner that provides enhanced realism through use of the substrate rendering module 110, which may include correction of perception such as skewing and other transformations.

The likely viewing direction is then used by the substrate rendering module 110 to render the three-dimensional model of the digital image 106 as disposed on the substrate 112 for display in the user interface 118 of the display device 120. An example 124 of such a rendered version of the digital image 106 is displayed in which the digital image 106 is depicted as disposed on the selected wood substrate. This may be performed for viewing a two dimensions (e.g., for display on a typical display device of a mobile phone) or in three dimensions (e.g., for stereoscopic display in a virtual reality or augmented reality scenario).

The substrate rendering module 110 is further configured to update the rendering of the three dimensional model of the digital image 106 in real time responsive to detection of changes in determined likely viewing direction as indicated by the sensors 116. For example, lighting, material properties, and so forth may change based on a viewing direction of a user to a material image in real life. To mimic this, the substrate rendering module 110 dynamically updates the rendering of the digital image 106 to mimic this real world interaction, thus improving a user's experience with the digital image 106. Further description of operation of the substrate rendering module 110 is included in the following and shown in a corresponding figure.

FIG. 2 depicts a system 200 in an example implementation showing a three dimensional model 202 of a digital image 106 as disposed on a substrate 112. The substrate rendering module 110, as previously described, receives as inputs a digital image 106, a selected definition of a substrate 112, and sensor 116 values exposed directly or indirectly (e.g., indication of orientation through an API of an operating system) by the computing device 102. From this, the substrate rendering module 110 produces the three dimensional model 202 of the digital image 106 as disposed on the substrate 112. The substrate 112, as illustrated, may define a height map. The height map defines different heights in a three-dimensional model at different locations of the substrate 112. These different heights may be used to form ridges, valleys, and so forth as illustrated to support a viewing of texture and other surface characteristics that may change based on viewing direction. The model 202 is then used to form the rendered image 204 that is output for display, e.g., on the display device 118 of the computing device 102.

The rendering is based on a likely viewing direction of a user when viewing the three-dimensional model 202 of the digital image 106 as disposed on the substrate 112. The substrate rendering module 110, for instance, may determine a surface normal of a viewing direction of a user in relation to the height map defined through the three dimensional model 202 of the digital image 106 as disposed on the substrate 112. A surface normal is a vector that is perpendicular to an object, which is the height map of the substrate 112 in this example as defined by the viewing direction and illustrated using dashed lines. Through use of the surface normal in combination of the height map of the three dimensional model 202 of the digital image 106 as disposed on the substrate 112, the substrate rendering module 110 may determine which portions are viewable to the user at that viewing direction. In this way, the rendered image 204 may change dynamically based on changes to the likely viewing direction.

For example, the height map may be defined such that a first viewing direction 206 may permit a user to view a portion 208 of the three dimensional model 202 of the digital image 106 on the substrate 112 that is not viewable from another viewing direction 210. This is due to changes in three dimensions in a relationship between the viewing direction and a topology of the model as defined by the height map. The rendered image 202 may also change based on light sources 212, material properties, and so forth as further described in the following. In this way, the substrate rendering module 204 may dynamically update rendering of the digital image 106 as disposed on the substrate 112 responsive to values received from the sensors 116 indicating a likely viewing direction.

Figure 3:
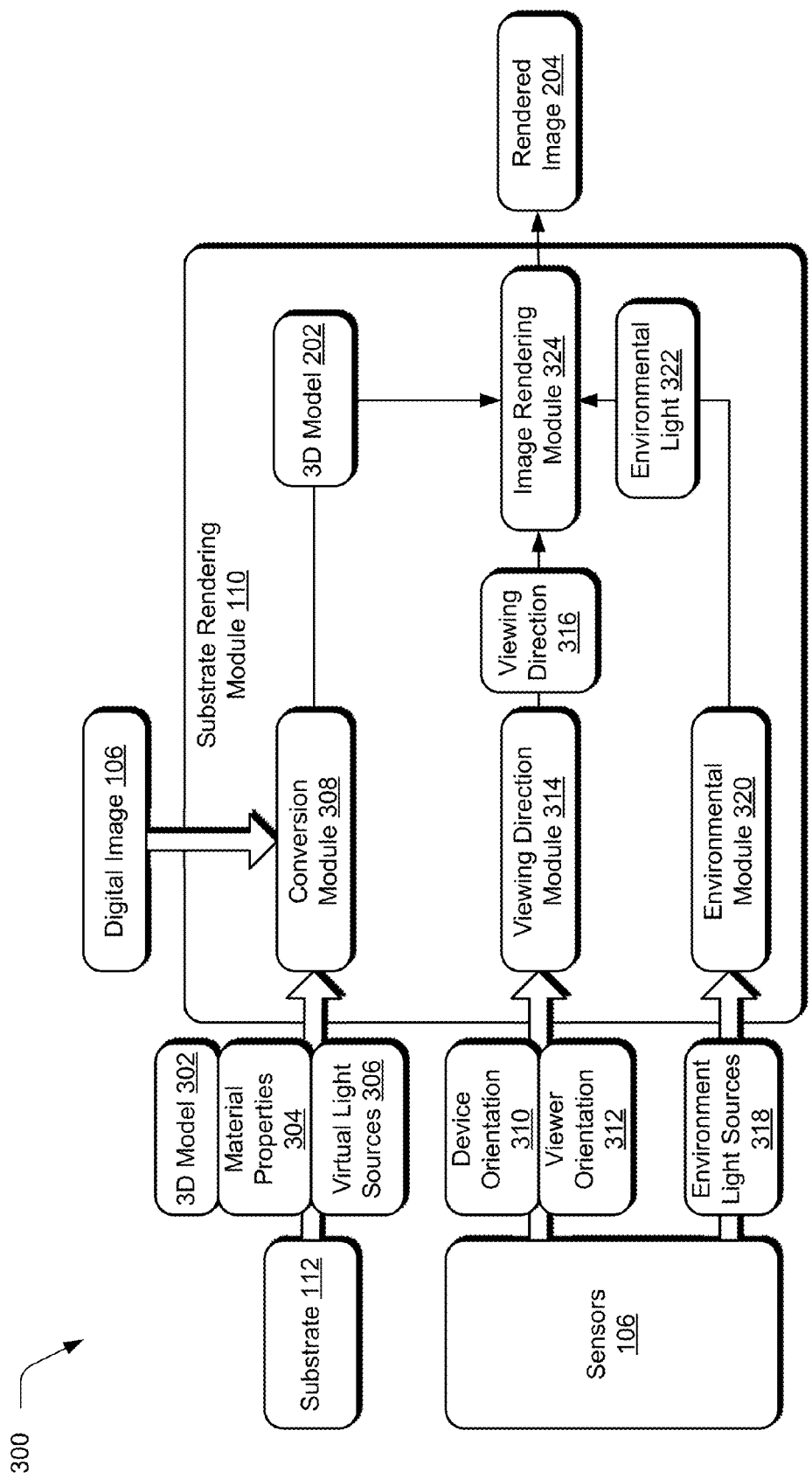
FIG. 3 depicts a system in an example implementation showing operation of a substrate rendering module of FIG. 2 in greater detail.

FIG. 3 depicts a system 300 in an example implementation showing operation of the substrate rendering module 110 of FIG. 2 in greater detail. The definition of the substrate 112 includes a variety of characteristics to mimic real world materials. Example of these characteristics include a 3D model 302, material properties 304, and virtual light sources 306. The 3D model 302 defines a surface of the substrate 112, such as woodgrain, textures of fibers, flat metal, ceramics, and so forth as shown in FIG. 2. Thus, the 3D model 302 provides a topology of the substrate 112 on which the digital image 106 is disposed to form a three-dimensional model 202 of the digital image 106.

The material properties 304 of the substrate 112 define how the surface of the 3D model 302 interacts with light. This may include a degree of reflectiveness of the substrate 112, absorbance, birefringence, color, luminosity, photosensitivity, refractive index, scattering, and transmittance. Material properties may change at different locations of the 3D model 302 of the defined substrate 112 and thus may also change when forming the 3D model 202 of the digital image 106 as disposed on the substrate 112.

The virtual light sources 210 are defined as part of the 3D model 302. A virtual light source 306, for instance, may be defined at a position in space relative to the 3D model 302 of the substrate 112. Accordingly, an effect is calculated of light from this virtual source 306 on the 3D model 202 of the digital image 106 as disposed on the substrate 112. As part of this, the material properties 304 are also taken into account.

The substrate rendering module 110 is also configured to receive inputs from the sensors 106. These inputs include a device orientation 310 and/or a viewer orientation 312 that are obtained by a viewing direction module 314 of the substrate rendering module 110. The viewing direction module 314 is implemented at least partially in hardware to determine a likely viewing direction 316 of a user in relation to a display device of the computing device 102. As previously described, the device orientation 310 describes an orientation of the display device of the computing device 102 in three dimensional space. The viewer orientation 312 is based on a head or eye location of a user, e.g., as detected using a camera.

The sensors 106 may also be employed to detect light sources of a physical environment 318 in which the computing device 102 is disposed. A sensor 116, for instance, may detect light in the physical environment when implemented as a camera. An environmental module 320 is implemented at least partially in hardware by the substrate rendering module 110 to determine a direction and intensity of the environmental light 322 from the sources through use of a camera. This environmental light 322 may then be modeled as part of forming the rendered image 202 from the 3D model 202 to increase realism in relation to a user's environment in which the digital image 106 is to be viewed.

The 3D model 302, viewing direction 316, and environmental light 322 are received as inputs by an image rendering module 324 of the substrate rendering module 110 to form the rendered image 204. The image rendering module 324 is implemented at least partially in hardware of the computing device 102 to render the 3D model 202 of the digital image 106 as disposed on the substrate 112. This may be performed to achieve a single two dimensional image (e.g., for display by a mobile phone), as a plurality of stereoscopic images (e.g., for display by an augmented or virtual reality device), and so forth.

The substrate rendering module 110 may also be configured to continue this rendering in real time as inputs are received from the sensors 106. This may be performed to address detected changes in a viewing direction 316, changes in environmental light 322, and so on. For example, images may be rendered at thirty to sixty times per second for display by the display device 118 of the computing device 102. In this way, a user views an effect of changes to the viewing direction and the environment on the 3D model 202 in real time in a manner that mimics interaction with a material image.

Figure 4:
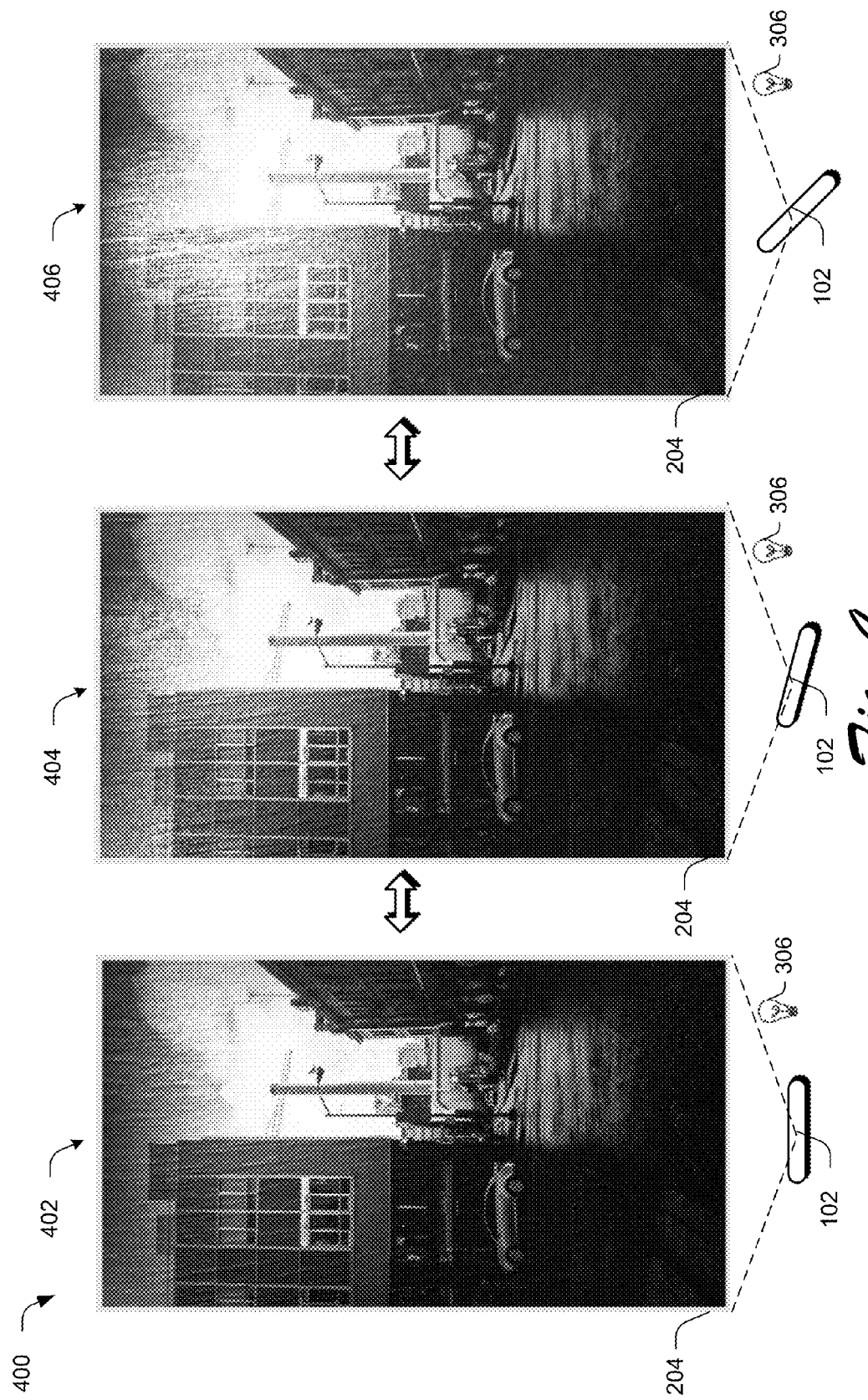
FIG. 4 depicts an example implementation of an effect of detected changes in viewing direction on rendering of a three dimensional model of FIG. 3 of a digital image as disposed on the substrate.

FIG. 4 depicts an example implementation 400 of an effect of detected changes in viewing direction 316 on rendering of the three dimensional model 202 of the digital image 106 as disposed on the substrate 112. This example is illustrated through first, second, and third stages 402, 404, 406. These stages illustrate a change in orientation of the computing device 102 as rotated towards a virtual light source 306.

In response, additional light from the virtual light source 306 is added to a corresponding portion of the rendered image 204 that is nearest to the virtual light source 306 when rendering the sequence of digital images from the 3D model 202. In this way, interaction involving movement of the computing device 102 to change a likely viewing direction 316 supports real time interaction in a manner that mimics interaction with a material image when rotating the image.

Figure 5:
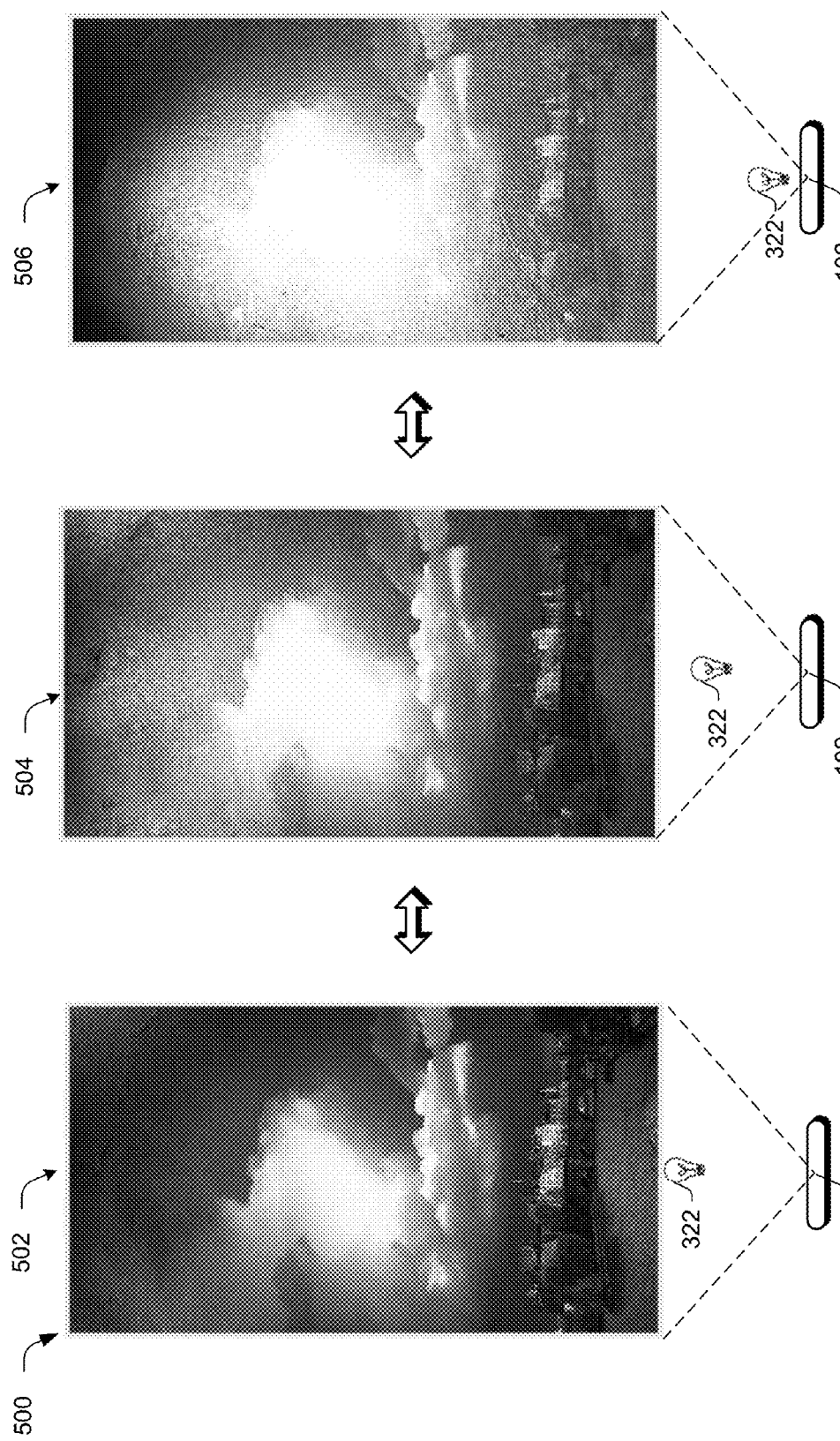
FIG. 5 depicts an example implementation of an effect of detected changes in a physical environment of a computing device on rendering of a three dimensional model of a digital image as disposed on a substrate.

FIG. 5 depicts an example implementation 500 of an effect of detected changes in a physical environment of the computing device 102 on rendering of the three dimensional model 202 of the digital image 106 as disposed on the substrate 112. This example is also illustrated through first, second, and third stages 502, 504, 506. In this example, however, an orientation of the computing device 102 does not change but rather movement of environmental light 322 in a physical environment of the device causes updates to the rendering of the 3D model 202 to form the sequence of rendered digital images.

In the illustrated example, the environmental light 322 moves closer to the computing device from the first to the second and third stages 502, 504, 506. In response, additional light is added to a corresponding portion of the rendered image 204 that is nearest to this light source by the image rendering module 324. In this way, interaction involving changes in a physical environment of the computing device 102 may also be addressed as part of the rendering. This supports real time interaction in a manner that mimics interaction with a material image in a physical environment of a user of the computing device 102.

Figure 6:
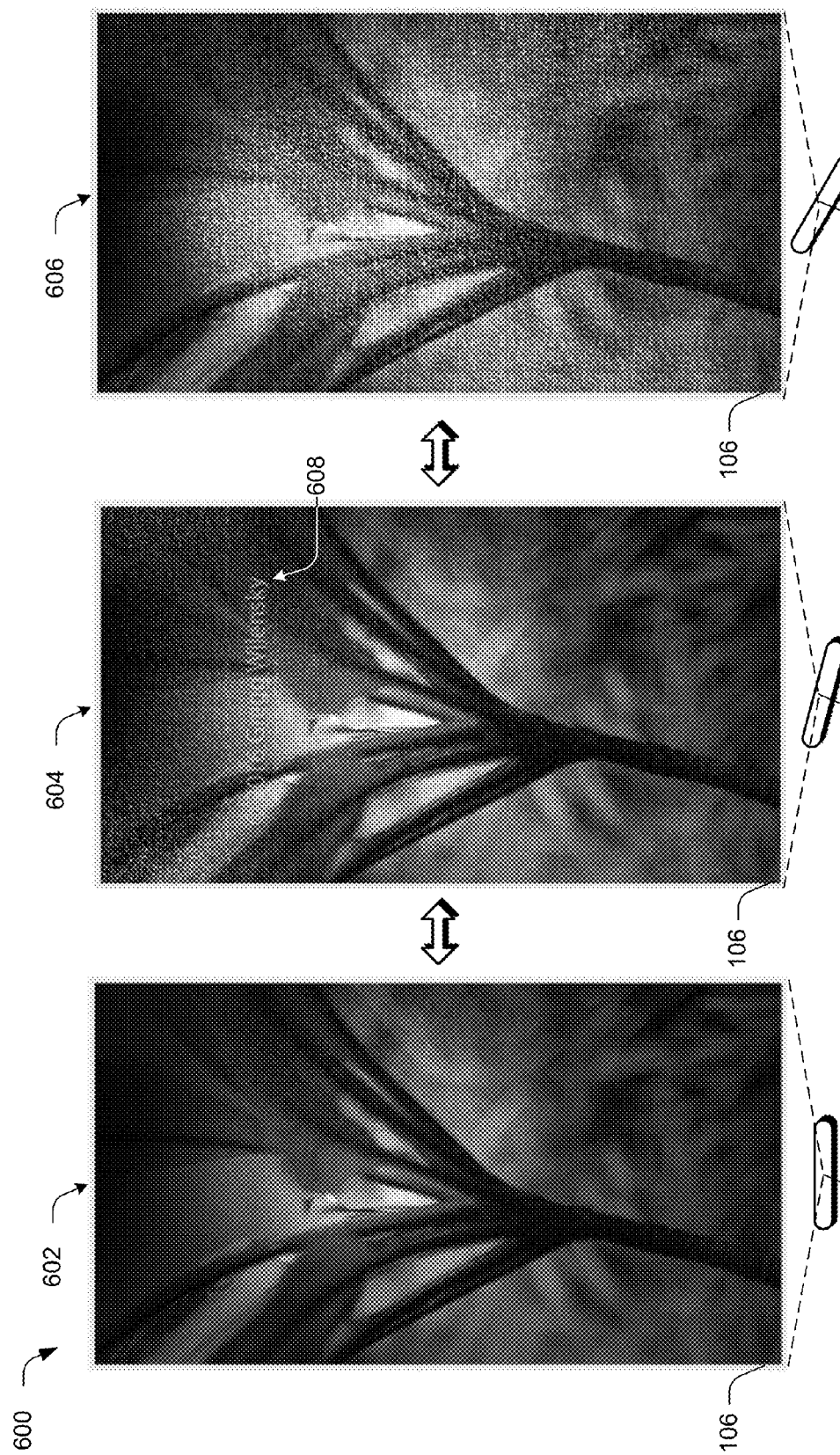
FIG. 6 depicts an example implementation in which digital content is incorporated as part of a three dimensional model of a digital image as being rendered on a substrate to be viewable from a particular viewing direction.

FIG. 6 depicts an example implementation 600 in which digital content is incorporated as part of the three dimensional model 202 of the digital image 106 as being rendered on the substrate 112 to be viewable from a particular viewing direction. This example is also illustrated using first, second, and third stages 602, 604, 606.

In this example, digital content is incorporated as part of the 3D model 202 of the digital image 106 as disposed on a substrate 112. As part of this, the digital content is configured to be viewed at a particular viewing direction but not at another viewing direction. In this way, inclusion of the digital content does not interfere with a user's experience in viewing the digital image at viewing directions other than the particular viewing direction. This may be used to support a variety of functionality.

In the illustrated example, a digital image 106 of a flower is shown as disposed on a canvas substrate. A 3D model 202 formed from the canvas substrate is also associated with a virtual light source disposed in a three dimensional space that is to the right of the digital image. Therefore, as the computing device 102 is rotated to the right in this example through the first, second, and third stages 602, 604, 606 an amount of light increases on the rendered images 106.

At a particular viewing direction at the second stage 604, however, digital content 608 associated with the digital image 106 is made available for viewing as part of the image. The digital content 608 in this example is a copyright notice and an artist's name Thus, the digital content 608 is made available for viewing but does not interfere with the viewing directions of the first and third stages 602, 606. A variety of other examples of digital content 608 are also contemplated, such as watermarks, hyperlinks (e.g., as part of an advertisement to a website associated with the advertisement), artist signatures, and so forth.

The configuration of the 3D model to permit and restrict viewing of the digital content may be achieved in a variety of ways. In one example, the simulated substrate material properties are modulated to overlay a raster (e.g., pixel based) representation of the digital content 608 (e.g., text) to simulate a shiny material. This shiny material is made visible when a light source (e.g., simulated or detected) is placed at the particular viewing direction. In another example, fluorescence is used for the digital content 608 having an intensity that is dependent upon the viewing direction. In this way, the observation of the digital content is not necessarily dependent upon the light color and intensity, but rather upon achieving the "right viewing angle" of the particular viewing direction for the lights, e.g., virtual or environmental. A variety of other examples are also contemplated as further described in the following.

Figure 7:
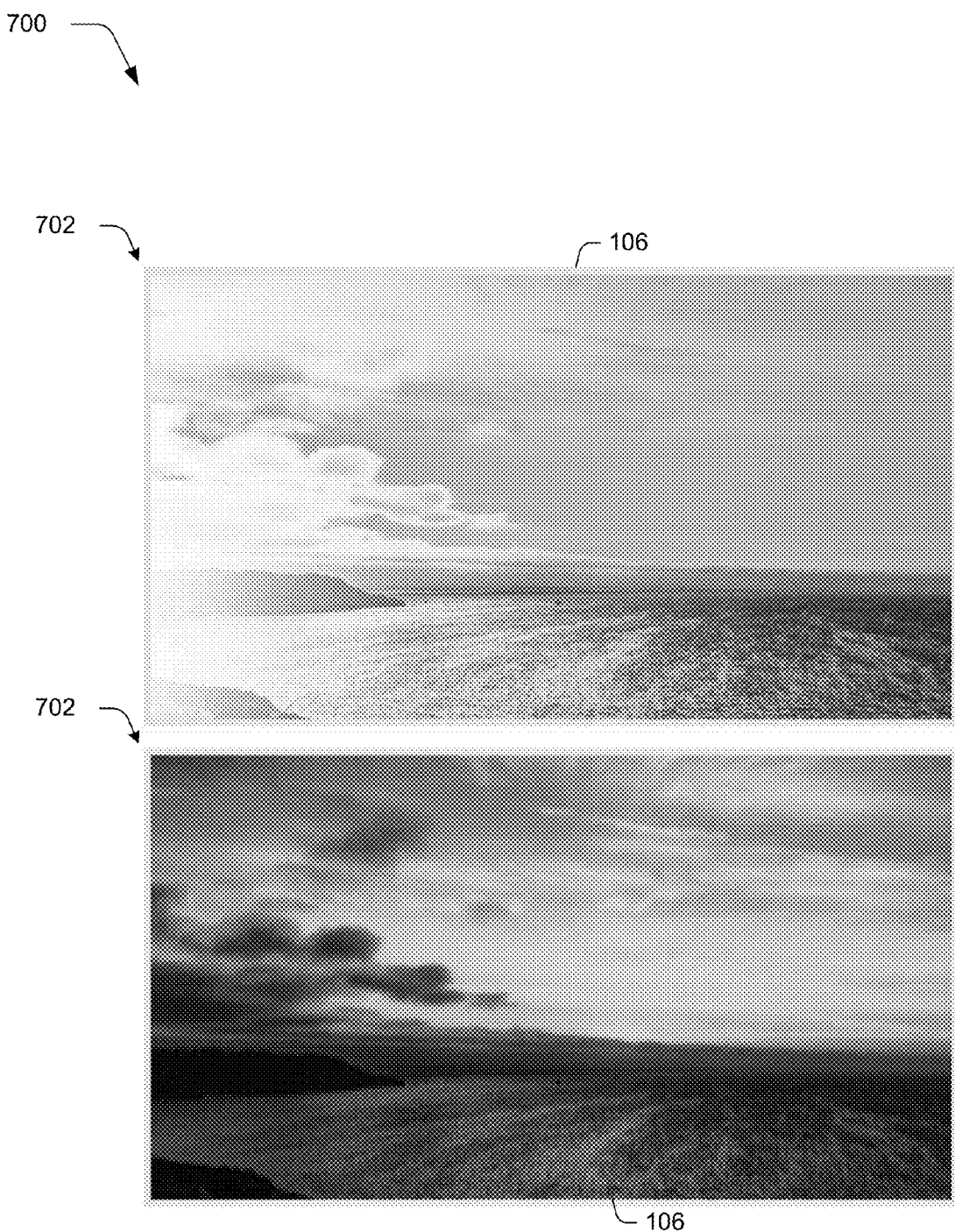
FIG. 7 depicts an example implementation of the digital image of FIG. 1 as rendered on a substrate to mimic a Daguerreotype.

FIG. 7 depicts an example implementation 700 of the digital image 106 of FIG. 1 as rendered on a substrate 112 to mimic a Daguerreotype. The digital image 106 is illustrated as rendered from first and second viewing directions 702, 704. In the first viewing direction 702, the digital image 106 appears as a negative rendition and in the second viewing direction 704, a positive rendition. The digital image 106 in the second viewing direction 704 is also blurred by overlaying reflected versions of the image to simulate finite thickness transparent overlay media.

Figure 8:
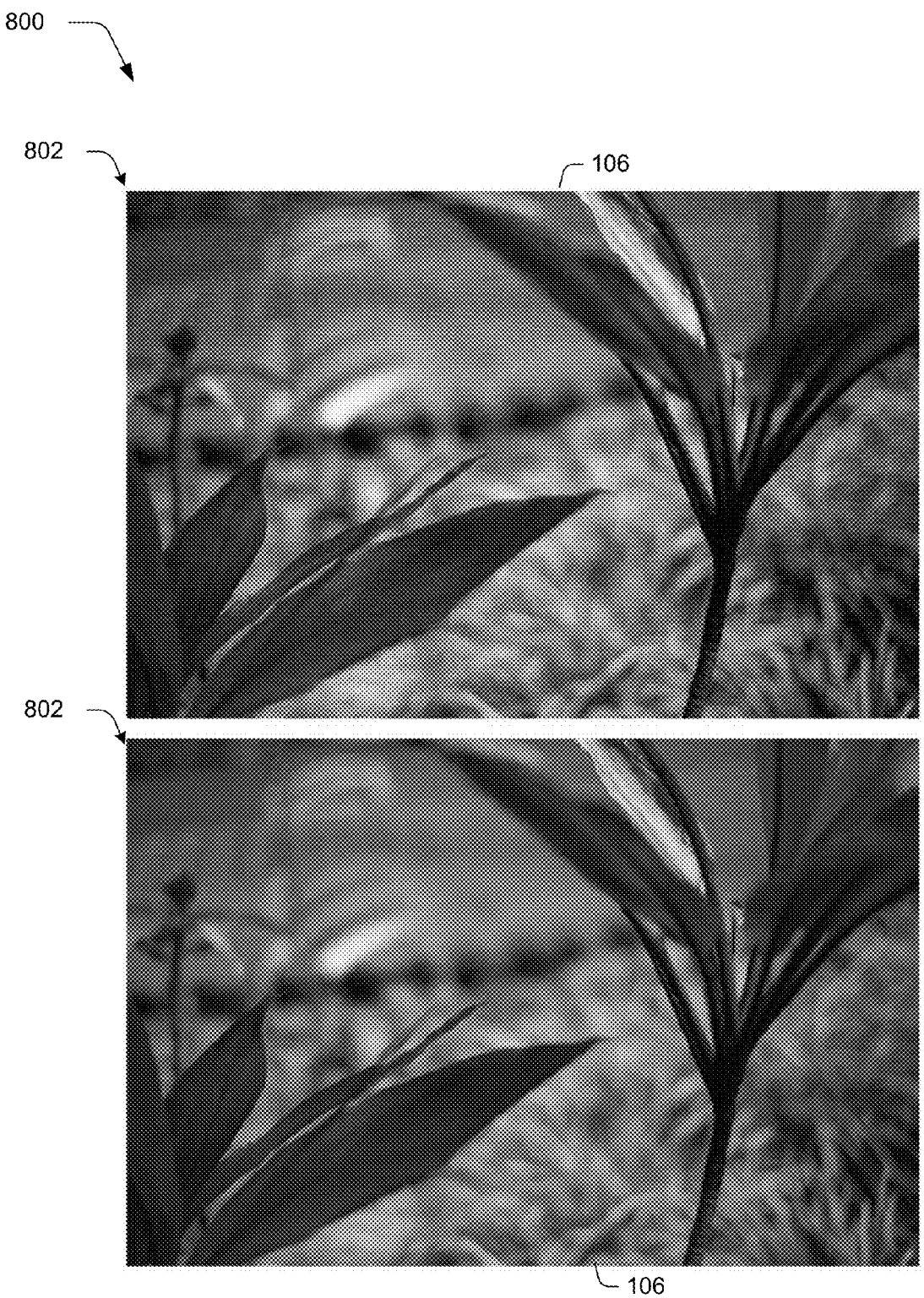
FIG. 8 depicts an example implementation showing first and second examples of the digital image of FIG. 1 as rendered on different substrates.

FIG. 8 depicts an example implementation 800 showing first and second examples 802, 804 of the digital image 106 of FIG. 1 as rendered on different substrates. The first and second examples 802, 804 illustrate subtle differences in how the digital image 106 is viewed, which may change dynamically due to changes in viewing direction and environmental conditions as previously described.

FIG. 9 depicts an example implementation 900 showing first and second examples 902, 904 of the digital image 106 of FIG. 1 as rendered on different substrates. In the first example 902 a substrate is used to provide a glitter effect to the flower and not the background. In the second example 904 a substrate is used to provide a glitter effect to the background and not the flower. The glitter effect may change in time to reflect the scintillating nature of real glitter materials. It may also change in dynamically in response to viewing direction or environmental condition changes.

The techniques described herein support a variety of usage scenarios that improve user experiences and promote realism. The substrate rendering module 110, for instance, may be configured as a standalone viewer that can be instantiated on a variety of different computing device platforms.

In one example, the techniques described herein are used to promote a user experience of a digital image 106 that mimics a user experience with a corresponding material image. An artist, for instance, may create a painting or photograph on a particular physical substrate that provides a richness of textures and interaction with light. For the material image, a gallery will carefully place lights to show the image and to highlight the textures, however conventional techniques lose this richness as previously described.

In the techniques described herein, however, the substrate rendering module 110 provides a digital viewer which enables an artwork to be viewed close to the original experience or with an alternately chosen simulated material substrate. The viewer is interactive, such that a change of simulated lighting angles mimics the effect of the play of lighting upon a real material. With this viewer, the artist is able to share artwork and enable the viewer to perceive a more faithful experience of the art over distances electronically, which was difficult if not impossible using conventional material images.

In another example, an artist shares a digital artwork and wants to place copyright information so that it can be seen by anyone viewing the work. However, at the same time, the artist does not want this information to obstruct this carefully produced artwork. The techniques described herein provide several mechanisms for doing so. The substrate rendering module 110, for instance, may configure the three dimensional model 202 to include the copyright notice as lightly visible or not visible at all unless the light shines (e.g., virtually based on virtual light sources 306 defined by the model or environmentally based on environmental light 322 of physical light sources in a physical environment) or device is oriented in a particular direction. For example, the rendering may be performed such that the information is visible, solely, when an additional physical light in a physical environment of the computing device 102 shines upon the device.

In yet another example, an artist may wish to produce a digital image which in some way surpasses the bounds of what can be done with real world materials. The techniques described herein enable the artist to apply non-realistic material properties to his digital artwork as well as non-physical interactions of light with the medium. This is done through definition of these properties as part of the substrate 112 and thus may be added, changed, and altered in a non-destructive manner A variety of other examples are also contemplated, further discussion of which is included in the following section.

Example Procedures

The following discussion describes rendering techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-9.

Figure 10:
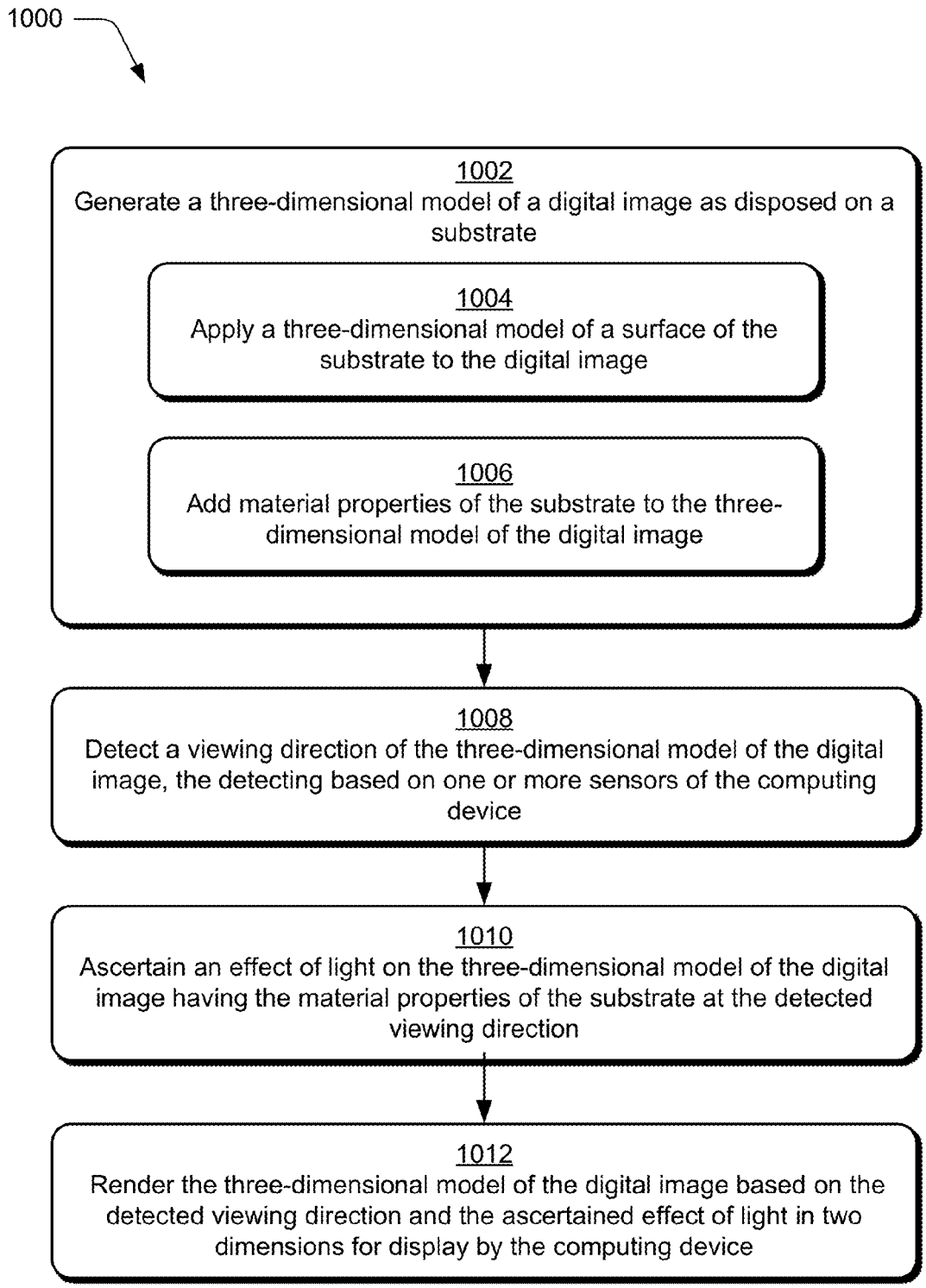
FIG. 10 is a flow diagram depicting a procedure in an example implementation in which in which a digital image is rendered on a defined substrate.

FIG. 10 depicts a procedure 1000 in an example implementation in which a digital image is rendered on a defined substrate. A three-dimensional model is generated of the digital image as disposed on a substrate (block 1002). Generation of the model includes application of a three-dimensional model of a surface of the substrate to the digital image (block 1004) and addition of material properties of the substrate to the three-dimensional model of the digital image (block 1006). The substrate 112, for instance, may include a 3D model 302 of the surface (e.g., a topology), material properties 304 of the surface, and virtual light sources 306. The substrate 112 may be selected by a user from a set of preconfigured options in a user interface.

The definition of the substrate 112 may also be formed by the user. The user, for instance, may form the 3D model 302 and "paint" material properties to this model. Material properties may also be detected from a physical environment of the computing device 102 (e.g., by using a camera) and so forth. These characteristics may also be configured to change over time, e.g., material properties and lighting may change to mimic interaction in the real world.

A viewing direction is detected of the three-dimensional model of the digital image, the detecting based on one or more sensors of the computing device (block 1008). The viewing direction may be based on a variety of different inputs as detected by the sensors 106. In one example, the inputs describe a device orientation 310 of the computing device 102 in three dimensional space. In another example, the inputs describe a likely viewer orientation 312, e.g., through gaze detection, head placement, and so forth. The viewer orientation 312 is likely in that the described viewer orientation 312 may differ from an actual viewer orientation 312 of the user, e.g., acts as an estimate or prediction.

An effect of light is ascertained on the three-dimensional model of the digital image having the material properties of the substrate at the detected viewing direction (block 1010). The effect of light, for instance, may originate from one or more virtual light sources 306 defined as part of the definition of the substrate 112. In another example, environmental light 322 of a physical environment of the computing device 102 is detected and modeled as part of rendering of the image.

The three-dimensional model of the digital image is rendered based on the detected viewing direction and the ascertained effect of light for display by the computing device (block 1012). Further, this rendering may be dynamically updated to address changes in a likely viewing direction, a physical environment of a user, or even defined changes to the 3D model 302, material properties 304, and virtual light sources 306 over time that are defined as part of the substrate 112. In this way, a digital image 106 may be transformed to support a dynamic interactive experience.

Figure 11:
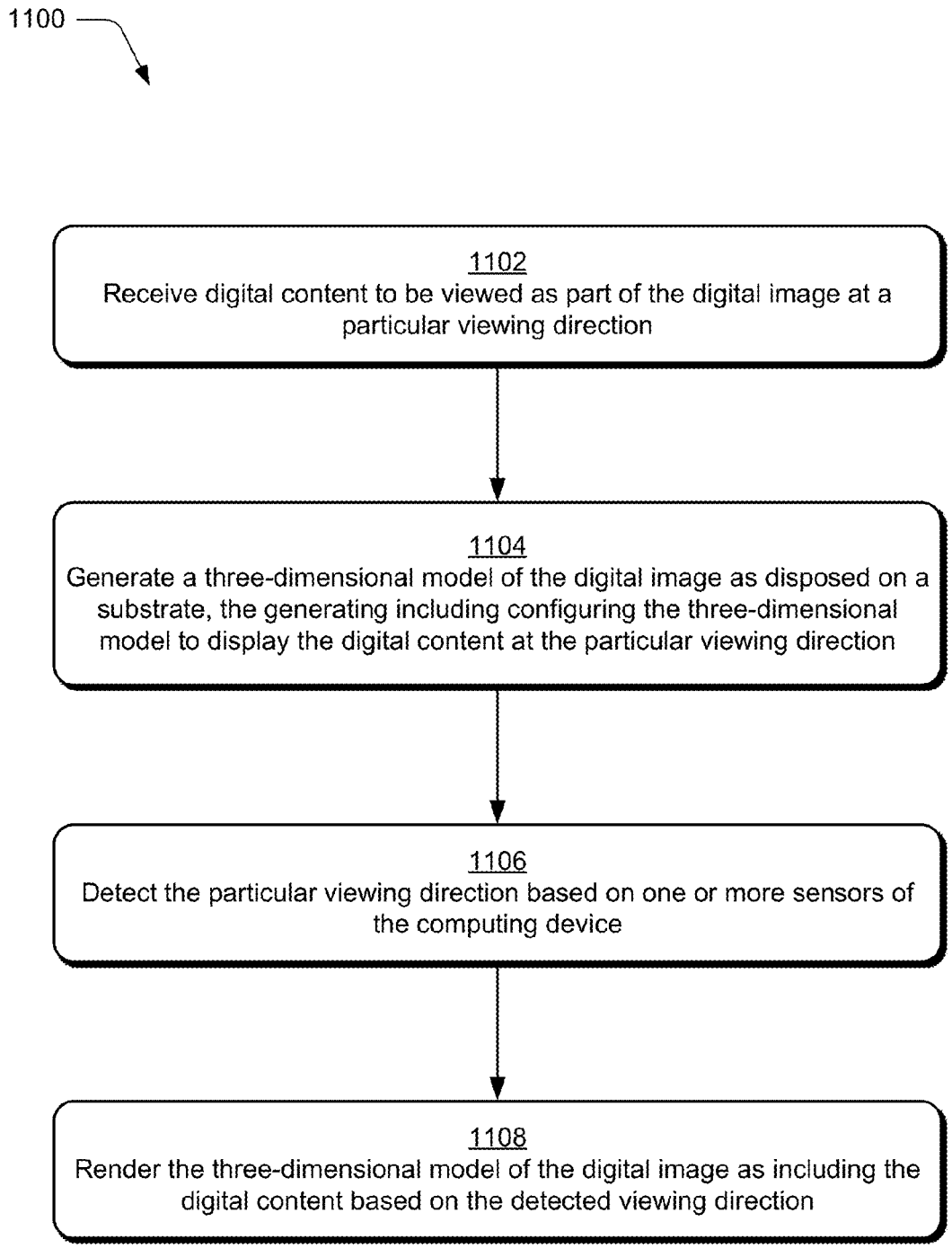
FIG. 11 is a flow diagram depicting a procedure in an example implementation in which digital content is rendered as part of a digital image on a defined substrate.

FIG. 11 depicts a procedure 1100 in an example implementation in which digital content is rendered as part of a digital image on a defined substrate. Digital content is received that is to be viewed as part of the digital image (block 1102). The digital content, for instance, may be configured as a watermark, copyright notification, hyperlink, advertisement, coupon code, QR code, and so forth.

A three-dimensional model is generated of the digital image as disposed on a substrate. The generation of the model includes configuring the three-dimensional model to display the digital content at a particular viewing direction (block 1104). The substrate rendering module 110, for instance, may configure the three dimensional model 202 to include the copyright notice as lightly visible or not visible at all unless the light shines (e.g., virtually or environmentally) or device is oriented in a particular direction. For example, the rendering may be performed such that the information is visible, solely, when an additional physical light in a physical environment of the computing device 102 shines upon the device at a particular viewing direction.

The particular viewing direction is detected based on one or more sensors of the computing device (block 1106). In response, the three-dimensional model of the digital image is rendered as including the digital content based on the detected viewing direction (block 1108). In this way, the digital content does not interfere with a user experience with the digital image at other viewing directions.

Example System and Device

Figure 12:
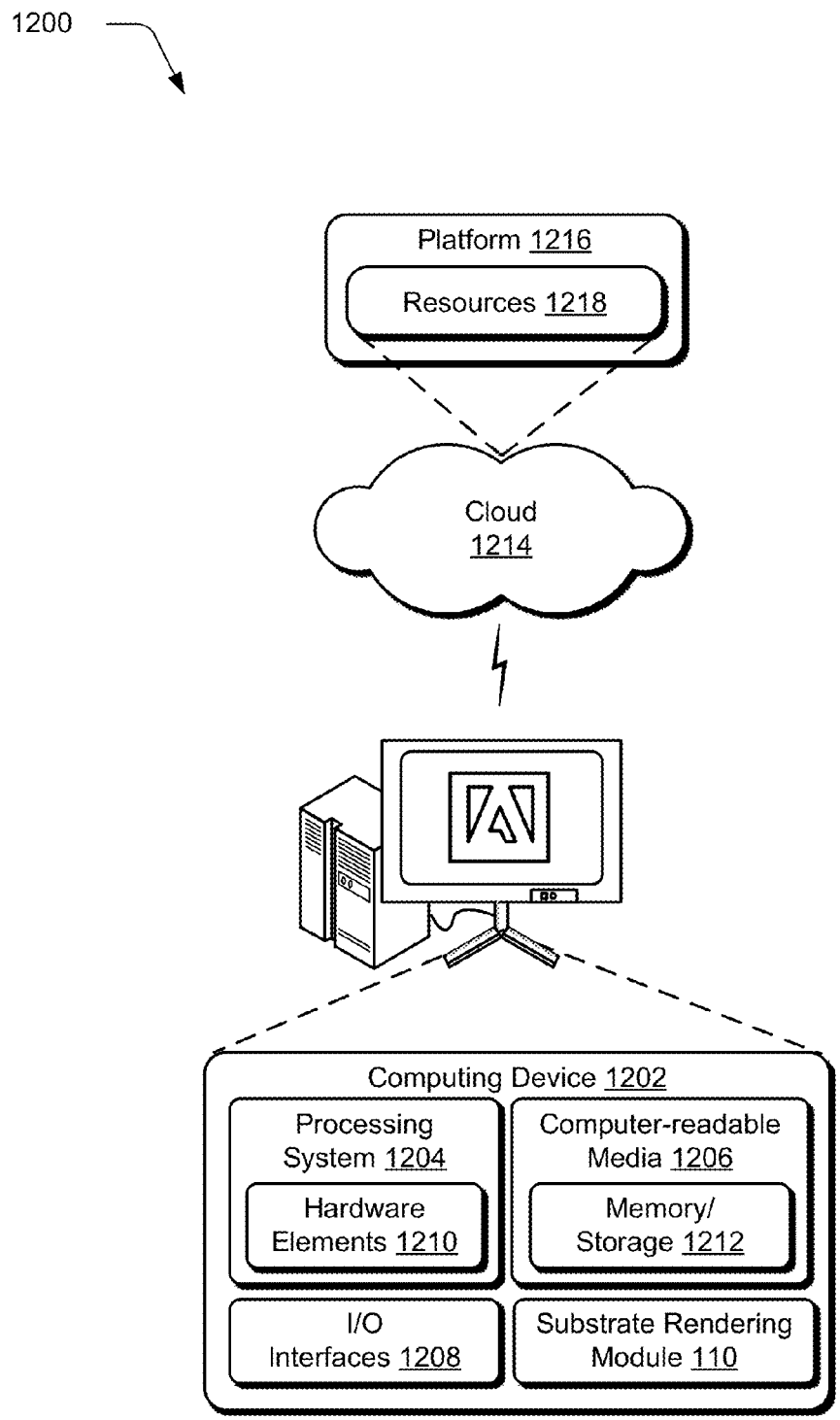
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. This is illustrated through inclusion of the substrate rendering module 110. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a method implemented by a computing device, the method comprising:
    receiving, by the computing device, a digital image, a three-dimensional model of a substrate, and digital content;
    applying, by the computing device, the digital image to the three-dimensional model of the substrate such that the digital image, as applied to the substrate, is viewable from a plurality of viewing directions based on an input from a sensor indicating an orientation in three-dimensional space;
    configuring, by the computing device, a material property of the three-dimensional model that includes the applied digital image to include the digital content as viewable at a particular viewing direction of the plurality of viewing directions; and
    outputting, by the computing device, the configured three-dimensional model to render the digital content as part of the digital image responsive to detection of the particular viewing direction by the sensor, such that the digital content is viewable at the particular viewing direction based on the material property of the substrate and is not viewable at another viewing direction of the plurality of viewing directions.

2. The method as described in claim 1, wherein the digital image is defined solely in two dimensions.

3. The method as described in claim 1, wherein the three-dimensional model of the substrate is configured as a height map and the determining of the viewing direction includes determining a surface normal direction in relation to the height map.

4. The method as described in claim 1, wherein the configured three-dimensional model includes a virtual effect of light defined in relation to the substrate of the three-dimensional model.

5. The method as described in claim 4, wherein the virtual effect of light includes intensity and direction of the light.

6. The method as described in claim 1, wherein the configured three-dimensional model is further configured to ascertain an effect of a light received by a camera associated with a display device on the configured three-dimensional model.

7. The method as described in claim 1, wherein the substrate includes the material property.

8. The method as described in claim 1, further comprising receiving a user input indicative of a selection of the substrate from a plurality of said substrates in a user interface of the computing device, in which each of the plurality of said substrates is associated with a respective said three-dimensional model and respective said material property.

9. The method as described in claim 1, wherein the configured three-dimensional model is configured to base the viewing direction on an orientation of the display device in three-dimensional space or a likely orientation of a user that views the display device.

10. The method as described in claim 1, wherein the digital content includes a watermark, copyright information, coupon code, hyperlink, or signature.

11. The method as described in claim 1, wherein the material property is glossiness, matte, or reflectivity.

12. In a digital medium environment to render a digital image, a method implemented by a computing device, the method comprising:
   receiving, by the computing device, a configured three-dimensional model that includes:
      a three-dimensional model of a substrate;
      the digital image applied to the three-dimensional model as viewable from a plurality of viewing directions; and
      digital content, configured as part of the three-dimensional model having the applied digital image and viewable via a first viewing direction of the plurality of viewing directions based on a material property of the three-dimensional model;
   detecting, by the computing device, the first viewing direction based on a sensor of the computing device as indicating an orientation in three-dimensional space; and
   rendering, by the computing device, the configured three-dimensional model as including the digital content as part of the digital image in response to the detected particular viewing direction, to permit viewing of the digital content at the first viewing direction while at least partially obstructing view of the digital content at a second viewing direction of the plurality of viewing directions, the second viewing direction being different than the first viewing direction.

13. The method as described in claim 12, further comprising detecting, by the computing device, another viewing direction based on the sensor of the computing device caused by movement of the computing device and wherein the rendering includes rendering the configured three-dimensional model of the digital image in two dimensions without the digital content.

14. The method as described in claim 12, wherein the sensor includes an accelerometer, magnetometer, inertial sensor, an ultrasonic sensor, use of electromagnetic or acoustic waves, or a time-of-flight camera.

15. The method as described in claim 12, wherein the digital content includes a watermark, copyright information, coupon code, hyperlink, or signature.

16. The method as described in claim 12, wherein:
   the substrate includes the material property; and
   the rendering is based on an ascertained effect of light on the material property of the substrate.

17. The method as described in claim 12, wherein the digital content includes a watermark, copyright information, coupon code, hyperlink, or signature.

18. In a digital medium environment, a system implemented by a computing device, the system comprising:
   a viewing direction subroutine configured to be executed by the computing device to detect a particular viewing direction of a plurality of viewing directions based on an orientation in three-dimensional space as detected by a sensor; and
   a digital image rendering subroutine configured to be executed by the computing device to:
      receive a configured three-dimensional model that includes a three-dimensional model of a substrate, a digital image applied to the three-dimensional model as viewable from the plurality of viewing directions, and digital content viewable only from a particular viewing direction of the plurality of viewing directions based on a material property of the substrate; and
      responsive to the detecting of the particular viewing direction by the viewing direction module, render the configured three-dimensional model of the digital image as part of the digital content.

19. The system as described in claim 18, wherein the digital content includes a watermark, copyright information, coupon code, hyperlink, or signature.

* * * * *